No. 741,124. PATENTED OCT. 13, 1903.
A. B. FOGLE.
DRAFT EVENER.
APPLICATION FILED FEB. 20, 1903.
NO MODEL. 2 SHEETS—SHEET 1.

Witnesses
Inventor
A. B. Fogle

No. 741,124. PATENTED OCT. 13, 1903.
A. B. FOGLE.
DRAFT EVENER.
APPLICATION FILED FEB. 20, 1903.
NO MODEL. 2 SHEETS—SHEET 2.

Witnesses
Gladys L. Thompson

Inventor
A. B. Fogle
By R. S. & A. B. Lacey
Attorneys

No. 741,124. Patented October 13, 1903.

UNITED STATES PATENT OFFICE.

ARCHIE B. FOGLE, OF OTEGO, KANSAS, ASSIGNOR OF ONE-FOURTH TO A. TEEPLE AND F. M. DRAKE, OF MANKATO, KANSAS.

DRAFT-EVENER.

SPECIFICATION forming part of Letters Patent No. 741,124, dated October 13, 1903.

Application filed February 20, 1903. Serial No. 144,299. (No model.)

*To all whom it may concern:*

Be it known that I, ARCHIE B. FOGLE, a citizen of the United States, residing at Otego, in the county of Jewell and State of Kansas, have invented certain new and useful Improvements in Draft-Eveners, of which the following is a specification.

The primary object of the present invention is to devise novel means for equalizing the draft of cultivators whereby the horses arranged upon opposite sides of the pole or tongue of the cultivator or like implement may travel in the space adjacent to the rows of plants being filled or cultivated. Within the purview of the invention the equalizer may be applied to agricultural machines of every type and variety where it is of advantage to have the draft-animals disposed in uneven number upon opposite sides of the pole.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
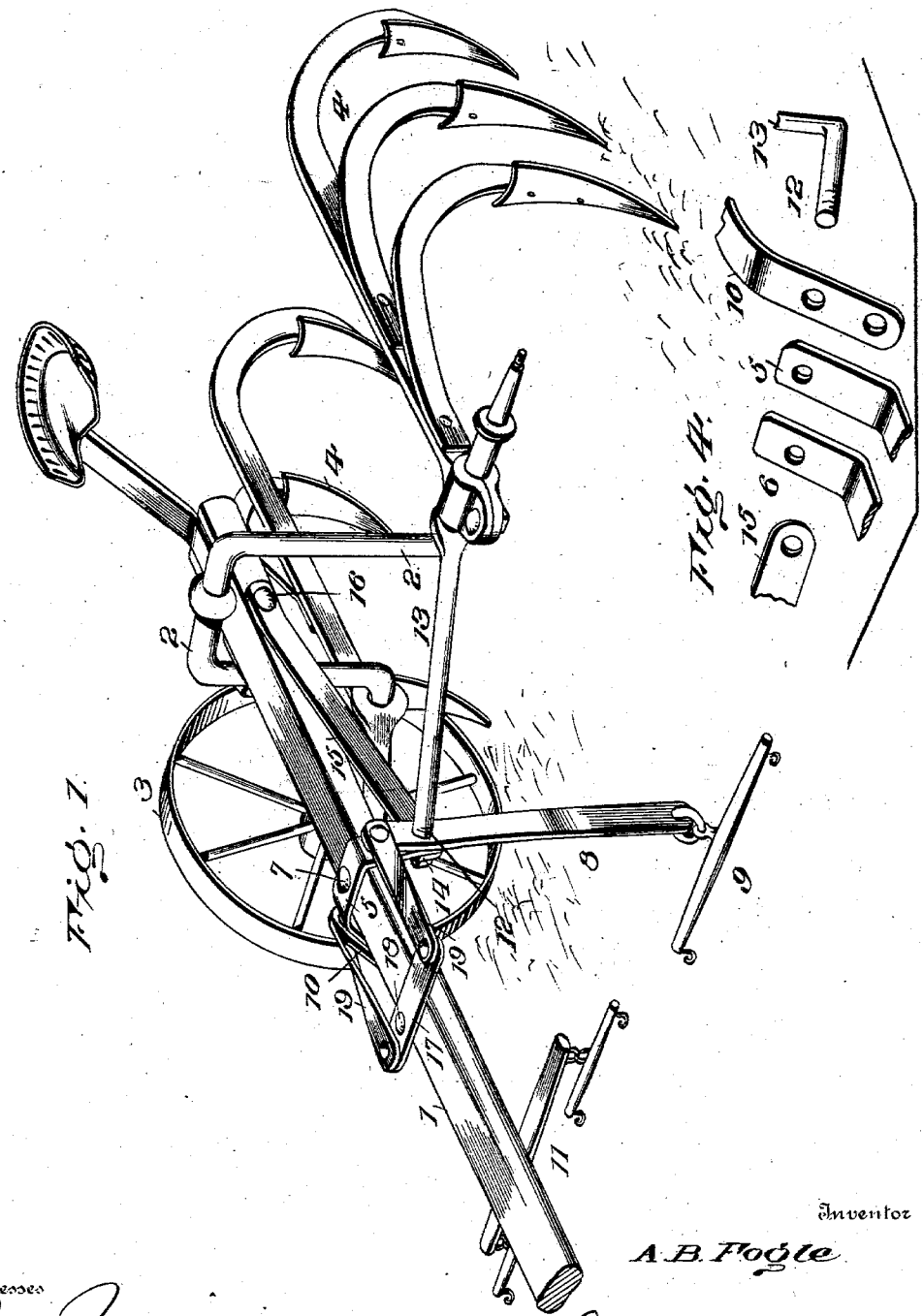
Figure 2:
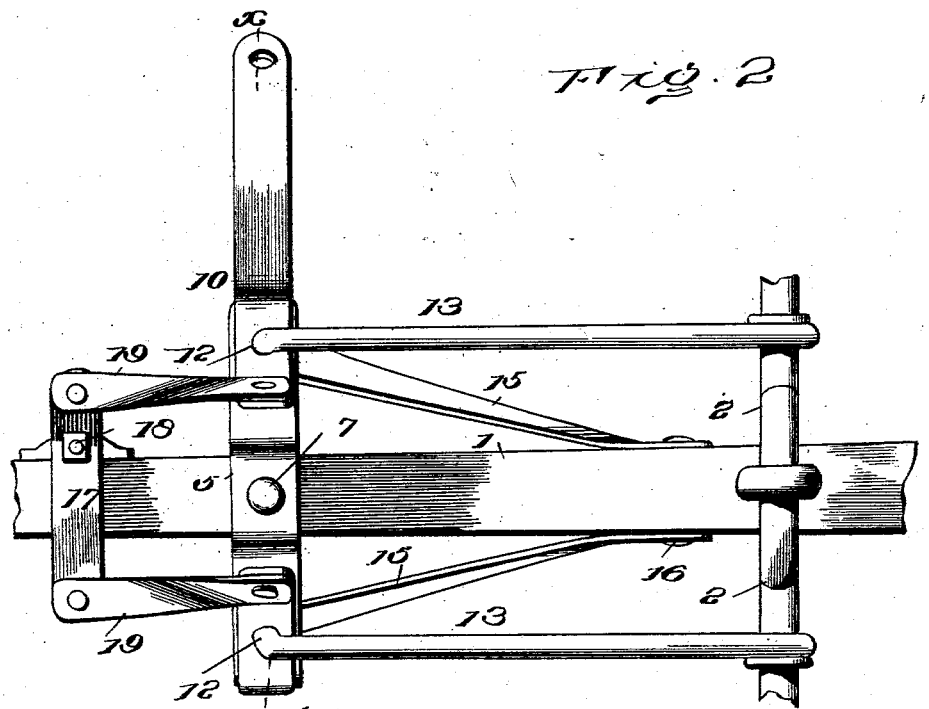
Figure 3:
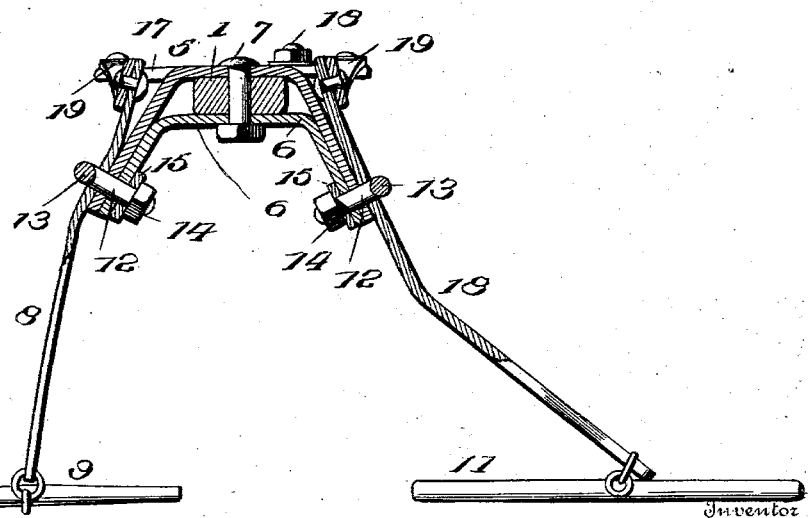

Figure 1 is a perspective view showing the invention applied to a cultivator of ordinary construction. Fig. 2 is a top plan view. Fig. 3 is a section on the line X X of Fig. 2 looking to the rear. Fig. 4 is a detail view showing more clearly the manner of connecting an end portion of the saddle to the corresponding end of the truss-brace and forming a fulcrum for the draft-lever.

Corresponding and like parts are referred to in the following description and indicated in all the views of the drawings by the same reference characters.

The implement illustrated for demonstrating the application of the invention comprises a pole or tongue 1, arched axle 2, ground-wheels 3, mounted upon the spindles of the arched axle, and cultivator-gangs 4. Forward of the axle 2 is located the saddle 5, which, as shown, consists of a bar having its end portions flexed and inclined outwardly and downwardly. The truss-brace 6, corresponding approximately in shape to the saddle, is arranged below the pole or tongue and is connected to the latter and to the saddle by means of the bolt or fastening 7, the end portions of the truss-brace being flexed and in contact with the inner sides of the lower end portions of the saddle 5. A lever 8 is fulcrumed a short distance from its upper end to an end portion of the saddle and truss-brace and is provided at its lower end with the swingletree 9 for hitching one draft-animal thereto. A corresponding lever 10 is similarly fulcrumed to the opposite end of the saddle and truss-brace and is provided at its lower end with a doubletree 11, carrying swingletrees for hitching two draft-animals thereto. The draft-levers 8 and 10 are arranged at an upward inclination and are mounted upon bent ends 12 of longitudinal braces or stays 13, having their rear ends connected to the respective end portions of the axle at the sides of the arch. The bent ends 12 of the braces or stays 13 pass through openings in the respective ends of the saddle and truss-brace in coincident relation and receive nuts 14 upon their threaded ends. It will thus be seen that the parts 12 while serving to connect the end portions of the parts 5 and 6 likewise form pivotal supports for the respective draft-levers. Other braces 15 are connected at their rear ends to the pole or tongue 1 by the bolt or fastening 16, and their front ends are pierced for reception of the bent ends 12 of the braces 13.

The equalizing-lever 17 is transversely arranged upon the pole or tongue in advance of the draft-levers and is connected thereto by the pivot-fastening 18 passing therethrough near one end. Links 19 pivotally connect opposite ends of the equalizing-lever with the upper ends of the respective draft-levers. The long arm of the equalizing-lever is connected with the draft-lever 8 and the short arm with the draft-lever 10. This arrangement enables a single draft-animal being placed upon one side of the pole and two draft-animals upon the opposite side.

The peculiar arrangement of the draft-levers admits of the draft-animals traveling in the spaces adjacent to the rows of plants being cultivated, which is of material advantage and enables the driver to maintain better control of the team. It is to be understood that the connecting parts may be shifted to allow for variation in the strength of the animals, so as to nicely equalize the load upon the swingle and double trees.

Having thus described the invention, what is claimed as new is—

1. In a draft-equalizer, the combination of a pole, a saddle and truss-brace arranged, respectively, above and below the pole and having their end portions overlapped, means connecting the saddle and truss-brace to each other and to the pole, draft-levers fulcrumed to the end portions of the saddle and truss-brace, and an equalizing-lever having its end portions connected to the upper ends of the respective draft-levers, substantially as set forth.

2. In a draft-equalizer, the combination of a pole, a saddle and truss-brace arranged, respectively, above and below said pole and having their end portions overlapped, means connecting the saddle and truss-brace to each other and to the pole, braces having their end portions bent and passed through openings in the end portions of the saddle and truss-brace in coincident relation, draft-levers mounted upon the bent ends of said braces, and an equalizing-lever having its ends connected to the upper ends of the respective draft-levers, substantially as described.

3. In an equalizer, the combination of a pole, an arched axle, a saddle and truss-brace secured to the pole with their end portions overlapped, braces connected at one end to the arms of the arched axle and having the other end bent and passed through openings in the ends of the said saddle and truss-brace, draft-levers mounted upon the bent ends of said braces, and an equalizing-lever having its end portions connected to the adjacent ends of the respective draft-levers, substantially as set forth.

4. In an equalizer, the combination of a pole, an arched axle, a saddle and truss-brace secured to the pole with their end portions overlapped, braces connected at one end to the arms of the arched axle and having the other end bent and passed through openings in the ends of the said saddle and truss-brace, other braces attached at one end to the pole and secured at the other end to the bent ends of the aforementioned respective braces, draft-levers mounted upon said bent ends of the first-mentioned braces, and an equalizing-lever having its ends connected to the adjacent ends of the respective draft-levers, substantially as set forth.

In testimony whereof I affix my signature in presence of two witnesses.

ARCHIE B. FOGLE. [L. S.]

Witnesses:
R. H. McBRIDE,
W. R. MITCHELL.